(12) United States Patent
Roland et al.

(10) Patent No.: US 6,942,564 B1
(45) Date of Patent: Sep. 13, 2005

(54) PASSENGER FOOT DUCT

(75) Inventors: Tim Roland, Clarkston, MI (US); Glenn Crocker, Marietta, GA (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 10/789,911

(22) Filed: Feb. 27, 2004

(51) Int. Cl.$^7$ .................................................. B60H 1/26
(52) U.S. Cl. ........................ 454/156; 454/144; 454/159
(58) Field of Search ............................... 454/121, 126, 454/144, 156, 159, 160, 161; 165/42, 43

(56) References Cited

U.S. PATENT DOCUMENTS

| | | | | |
|---|---|---|---|---|
| 3,919,926 | A | * | 11/1975 | Yamada .................... 454/144 |
| 5,217,405 | A | * | 6/1993 | Tanaka ..................... 454/121 |
| 5,673,964 | A | * | 10/1997 | Roan et al. ................ 296/208 |
| 5,711,368 | A | * | 1/1998 | Ito et al. ................... 165/42 |
| 6,148,904 | A | * | 11/2000 | Tsunooka et al. .......... 165/43 |
| 6,231,437 | B1 | * | 5/2001 | Loup et al. ................ 454/160 |
| 6,352,208 | B1 | * | 3/2002 | Shibata et al. ............ 237/2 A |
| 6,644,559 | B2 | * | 11/2003 | Kondo et al. ............. 237/12.3 B |
| 2004/0018812 | A1 | * | 1/2004 | Tanoi ........................ 454/121 |

* cited by examiner

Primary Examiner—Harold Joyce
(74) Attorney, Agent, or Firm—Harness, Dickey & Pierce, PLC

(57) ABSTRACT

An HVAC assembly including an HVAC case disposed in a passenger compartment of a vehicle for delivering air at a passenger side foot well includes a duct coupled to an opening on the HVAC case. The duct is configured to deliver air from the HVAC case to the passenger foot well. The passenger foot well is defined by a front boundary, a lower boundary and two side boundaries. The duct includes an input coupled to the opening on the HVAC case and accepting air into an upstream portion having a single passage. The upstream portion directs air in a generally upward direction away from the lower boundary of the passenger side foot well. The duct further includes an intermediate portion whereby the single passage divides into a first and second passage. A first and second outlet is coupled to and downstream of the first and second passage and dispense air at the passenger side foot well.

14 Claims, 10 Drawing Sheets

US 6,942,564 B1

PASSENGER FOOT DUCT

FIELD OF THE INVENTION

The present invention relates to HVAC systems in vehicles and more particularly to a duct for delivering air from an HVAC case onto a delivery area at a passenger side foot well of an automobile.

BACKGROUND OF THE INVENTION

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger compartment. Some vehicles include an air conditioning system that cooperates with an evaporator for absorbing heat from the air in the vehicle. The heater core and evaporator are typically provided in an HVAC case located in the passenger compartment of the vehicle.

A vehicle dash panel defines a boundary between an engine compartment and a passenger compartment. There has been an increasing trend to provide increased space within the passenger compartment of the vehicle. To accommodate such demand, automobile manufacturers are revising the layout of instrument panels to increase space. The profiles of instrument panels are becoming lower and decreasing in size. As a result, packaging challenges are created for components cooperating with or contained within the instrument panel.

One of the major components subject to packaging challenges is the HVAC case and related ducting required to allow the hot and cold air to enter and exit the passenger compartment. The location of respective dash panel defrost air outlets, instrument panel venting air outlets and floor directed air outlets remains a critical factor in HVAC performance and overall passenger comfort. As a result, it is necessary to provide an effective ducting system for delivering heated and cooled air at the desired locations into the passenger compartment while satisfying packaging constraints.

SUMMARY OF THE INVENTION

An HVAC assembly including an HVAC case disposed in a passenger compartment of a vehicle for delivering air at a passenger side foot well includes a duct coupled to an opening on the HVAC case. The duct is configured to deliver air from the HVAC case to the passenger foot well. The passenger foot well is defined by a front boundary, a lower boundary and two side boundaries. The duct includes an input coupled to the opening on the HVAC case and accepting air into an upstream portion having a single passage. The upstream portion directs air in a generally upward direction away from the lower boundary of the passenger side foot well. The duct further includes an intermediate portion whereby the single passage divides into a first and second passage. A first and second outlet is coupled to and downstream of the first and second passage. The first and second outlets dispense air at the passenger side foot well.

According to other features the first and second passage include a first and second downstream portion connecting the first and second passage at the intermediate portion to the first and second outlet. The first and second passage extend in a first direction at the intermediate portion and extend at a substantially transverse direction at the first and second downstream portion. The intermediate portion includes a planar portion extending between the first and second passage. The planar portion borders the first and second downstream portion at a substantially perpendicular orientation with respect to the first and second downstream portion. The planar portion is adapted to inhibit air flow out of said storage compartment through an upper opening in said storage compartment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
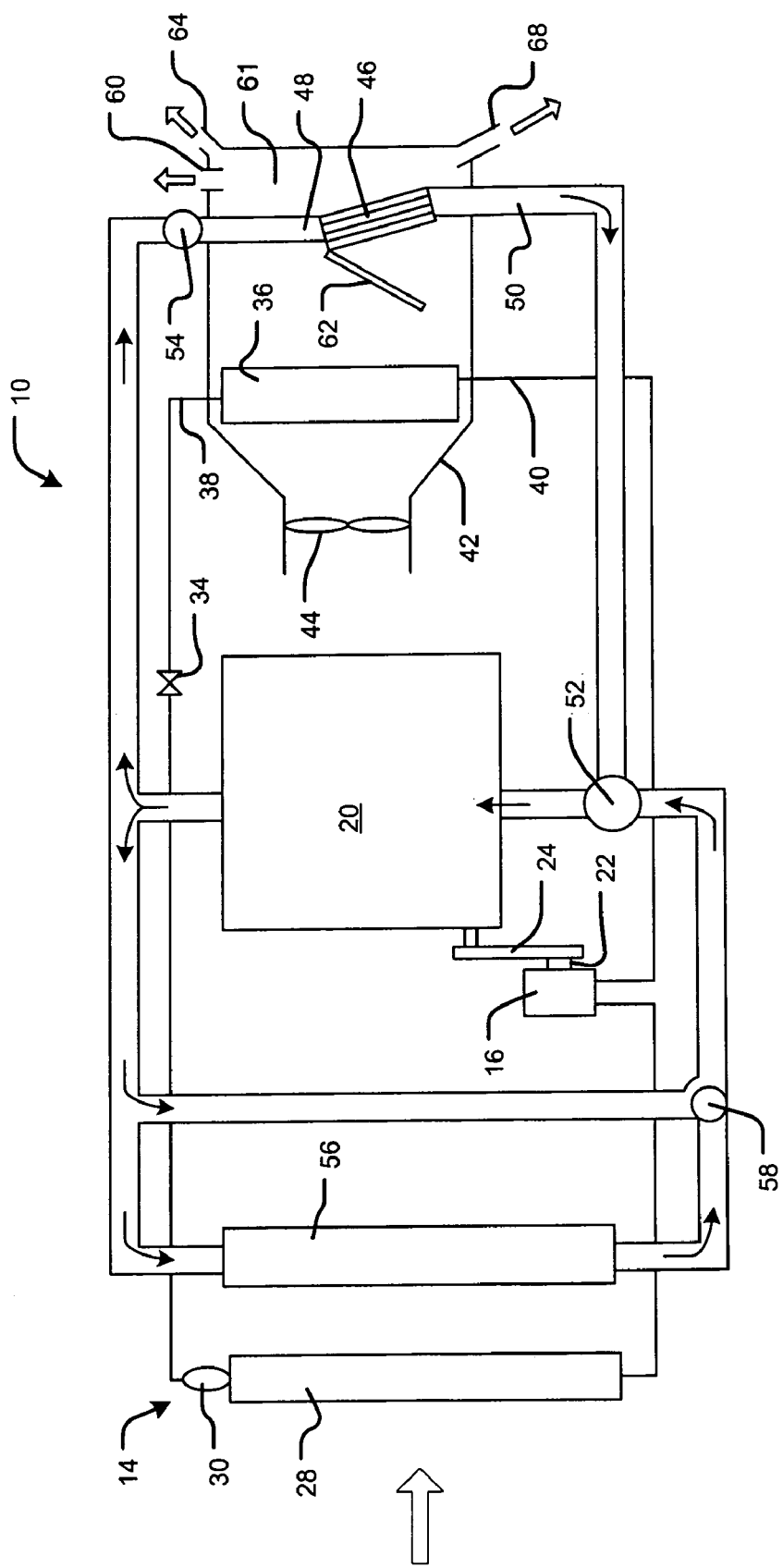
FIG. 1 is a functional block diagram of an HVAC system of a vehicle.

With initial reference to FIG. 1, a block diagram of a conventional vehicle HVAC system is shown and generally identified at reference 10. A refrigeration cycle R of the vehicle HVAC system 10 includes an air-cooling system 14. The air-cooling system 14 includes a compressor 16 which draws, compresses, and discharges a refrigerant. The power of a vehicle engine 20 is transmitted to the compressor 16 through pulleys 22 and a belt 24.

As is well known, the vehicle engine 20 drives not only the air conditioning compressor 16 but also such auxiliaries as a generator, a hydraulic pump for a power steering unit, and a coolant pump via belts and other power transmitting devices.

In the refrigeration cycle R, the compressor 16 discharges a superheated gas refrigerant of high temperature and high pressure, which flows into a condenser 28. Here, heat exchange is performed with the outside air sent by a cooling fan (not shown), so that the refrigerant is cooled for condensation. The refrigerant condensed in this condenser 28 then flows into a receiver 30, in which the refrigerant is separated into a gas and a liquid. A redundant liquid refrigerant in the refrigeration cycle R is stored inside the receiver 30.

The liquid refrigerant from the receiver 30 is decompressed by an expansion valve 34 into a gas-liquid double phase state of low pressure refrigerant. The low pressure refrigerant from the expansion valve 34 flows into an evaporator 36 by way of an inlet pipe 38. The evaporator 36 is arranged inside an HVAC case 42 of the vehicle air conditioning system 14. The low pressure refrigerant flowing into the evaporator 36 absorbs heat from the air inside the HVAC case 42 for evaporation. An outlet pipe 40 of the evaporator 36 is connected to the suction side of the compressor 16, so that the cycle components mentioned above constitute a closed circuit.

The HVAC case 42 forms a ventilation duct through which air conditioning air is sent into the passenger compartment. The HVAC case 42 contains a fan 44 which is arranged on the upstream side of the evaporator 36. An inside/outside air switch box (not shown) is arranged on the suction side of the fan 44 (the left side in FIG. 1). The air inside the passenger compartment (inside air) or the air outside the passenger compartment (outside air) switched and introduced through the inside/outside air switch box is sent into the HVAC case 42 by the fan 44.

The HVAC case 42 accommodates, on the downstream side of the evaporator 36, a hot water heater core (heat exchanger) 46. The heater core 46 includes an inlet pipe 48 and an outlet pipe 50. Hot water (coolant) of the vehicle engine 20 is directed to the heater core 46 through the inlet pipe 48 by a water pump 52. A water valve 54 controls the flow volume of engine coolant supplied to the heater core 46. A radiator 56 and a thermistor 58 further cooperate to control the temperature of the coolant.

A bypass channel 61 is formed beside the hot water heater core 46. An air mix door 62 is provided to adjust the volume ratio between warm air and cool air that passes through the hot water heater core 46 and the bypass channel 61, respectively. The air mix door 62 adjusts the temperature of the air blown into the passenger compartment by adjusting the volume ratio between the warm air and cool air.

Additionally, a face outlet 64, a foot outlet 68, and a defroster outlet 60 are formed at the downstream end of the HVAC case 42. The face outlet 64 directs air toward the upper body portions of passengers, the foot outlet 68 directs air toward the feet of the passengers, and the defroster outlet 60 directs air toward the internal surface of a windshield. The outlets 60, 68 are opened and closed by outlet mode doors (not shown). The air mix door 62 and the outlet mode doors mentioned above are driven by such electric driving devices such as servo motors via linkages or the like.

Figure 2:
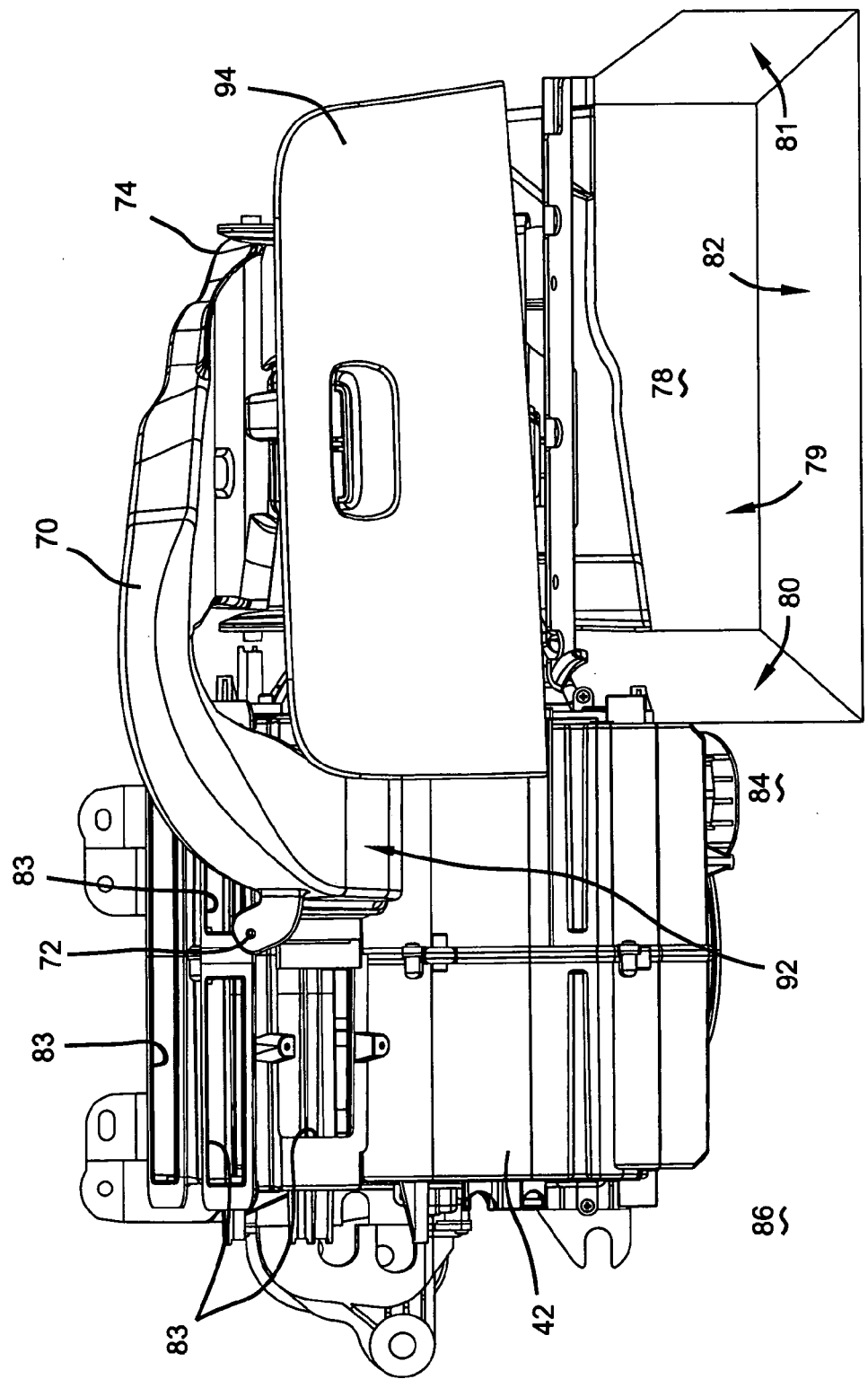
FIG. 2 is a front view of the passenger foot duct according to the present teachings shown in an assembled position with an HVAC case and storage compartment of a vehicle.
Figure 3:
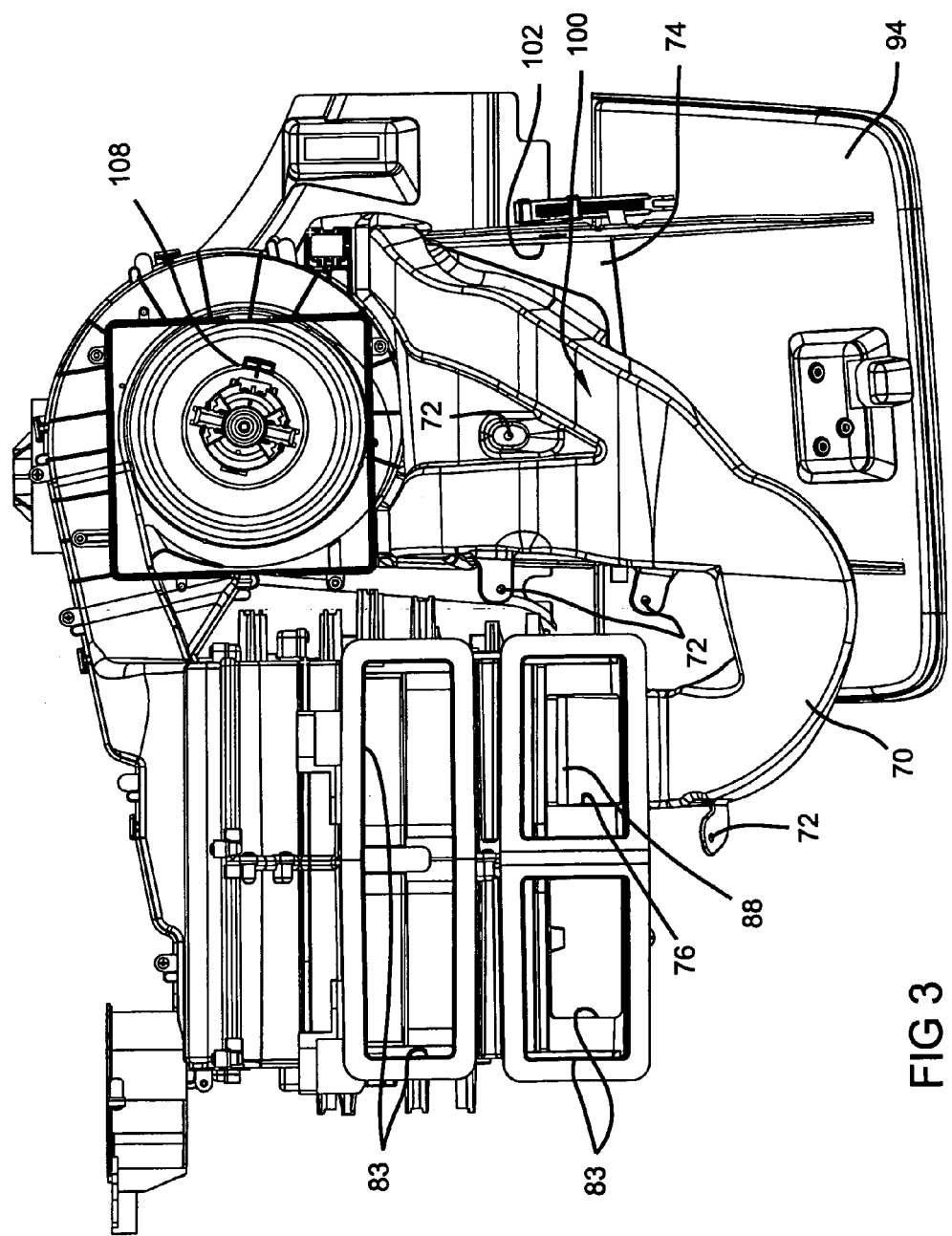
FIG. 3 is a plan view of the passenger foot duct and HVAC case of FIG. 1.

Turning now to FIGS. 2 and 3, a passenger foot duct according to the present teachings is shown and generally identified at reference 70. The passenger foot duct 70 is coupled to the HVAC case 42 in the passenger compartment of the vehicle at attachment points 72 and configured to deliver air from the HVAC case 42 onto the feet of an occupant in the passenger seat of the vehicle. As will be described in greater detail, the passenger foot duct 70 is adapted to route from an opening 76 (FIG. 3) in the HVAC case 42, around and above a storage compartment 74 disposed adjacent to the HVAC case 42, and to a first and second outlet aimed at a delivery area or foot well 78 onto the feet of a passenger. The foot well 78 is generally defined by a front boundary 79, a first and second side boundary 80 and 81 and a lower boundary 82.

The opening 76 in the HVAC case 42 is one of a plurality of openings arranged on the HVAC case 42 for delivering air to other delivery destinations associated with the face outlet 64, the foot outlet 68 and the defroster outlet 60. In general the openings 76 and 80 are located on the HVAC case 42 at an intermediate position between a passenger side compartment 84 and a driver side compartment 86 of vehicle.

With continued reference to FIG. 2 and further reference to FIGS. 3–5, the orientation of the passenger foot duct 70 will be described in greater detail. The passenger foot duct 70 is coupled at an input 88 to the opening 76 in the HVAC case 42 and directs air through an upstream portion 92 generally upward away from the floor of the vehicle (FIG. 2) and forward into the passenger compartment of the vehicle (FIG. 3). The passenger foot duct 70 is then routed to an area above the storage compartment 74 and a storage compartment door 94. As will be described further, an intermediate portion 100 of the passenger foot duct 70 is arranged to cover a portion of an upper opening 102 in the storage compartment 74 to impede air flowing from the storage compartment 74 into a blower fan 108 disposed above the storage compartment 74. As a result, contents in the storage compartment 74 are less likely to be ingested into the blower fan 108.

Figure 4:
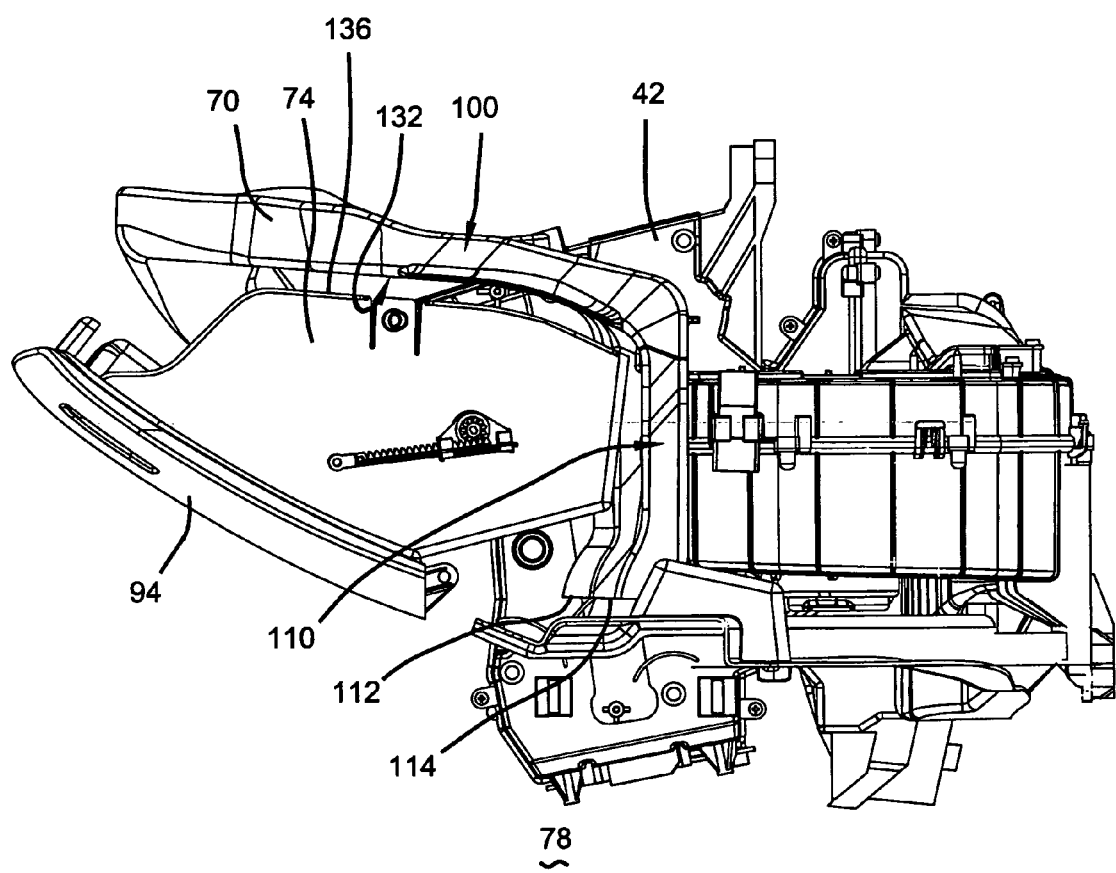
FIG. 4 is a side view of the passenger foot duct and HVAC case of FIG. 1.
Figure 5:
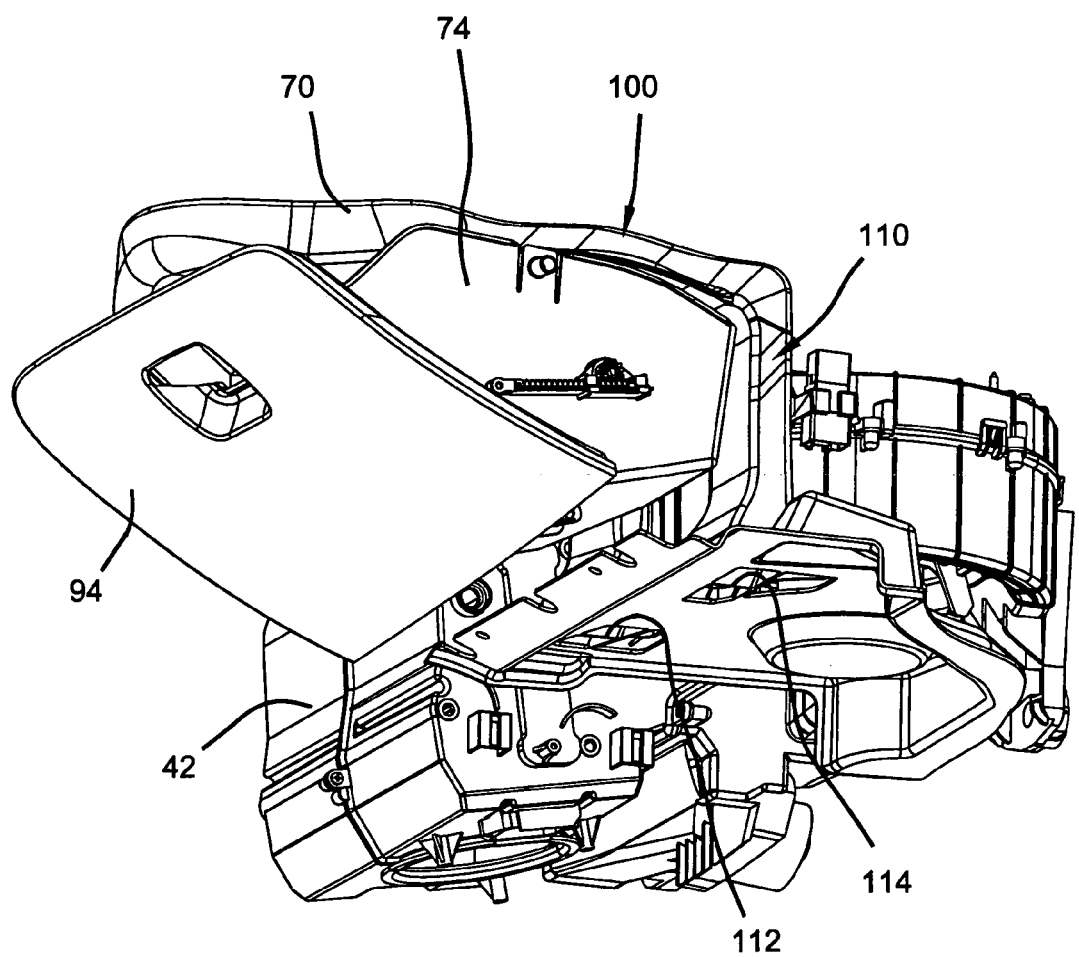
FIG. 5 is a bottom perspective view of the passenger foot duct and storage compartment of FIG. 2.
Figure 6:
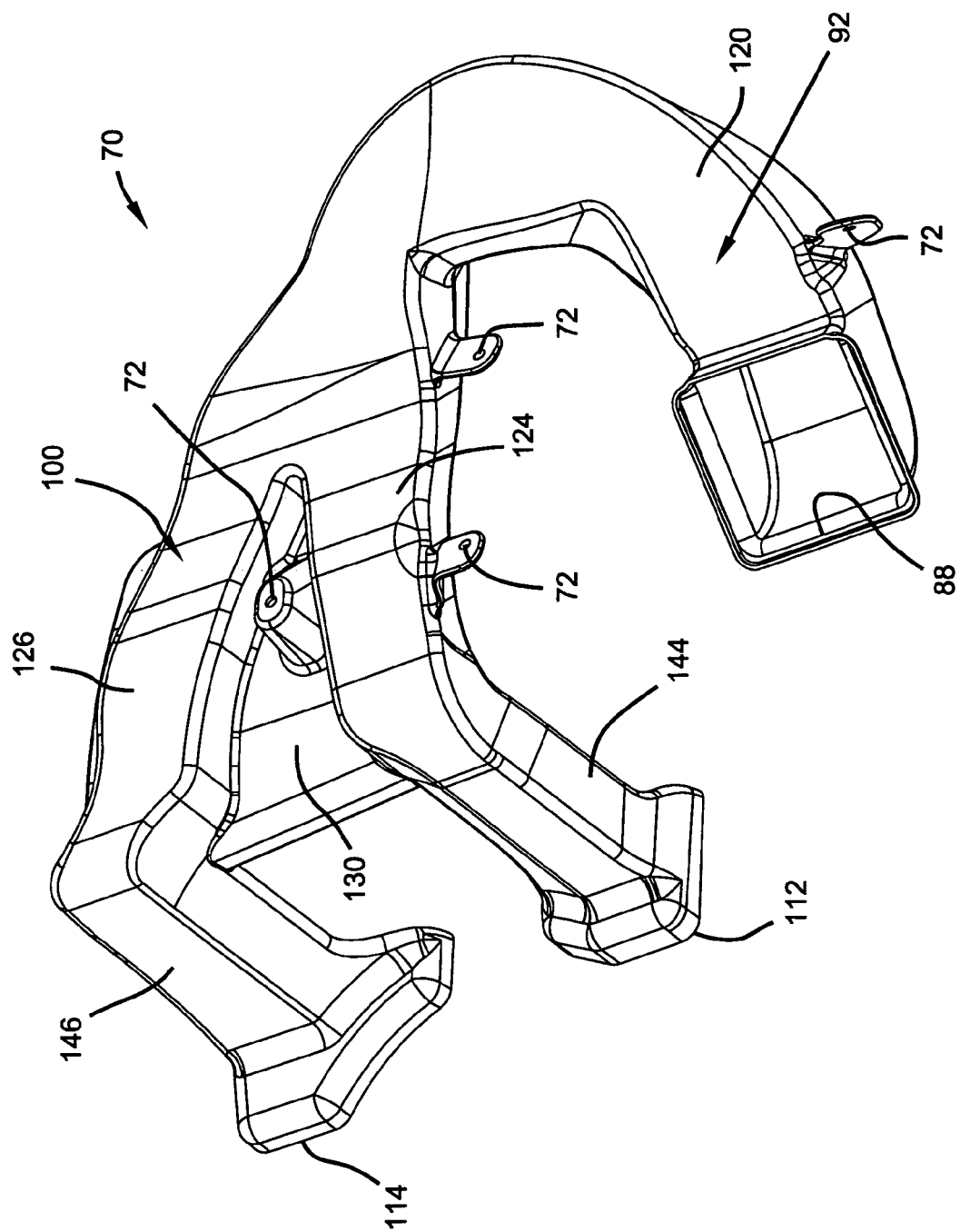
FIG. 6 is a rear perspective view of the passenger foot duct.
Figure 7:
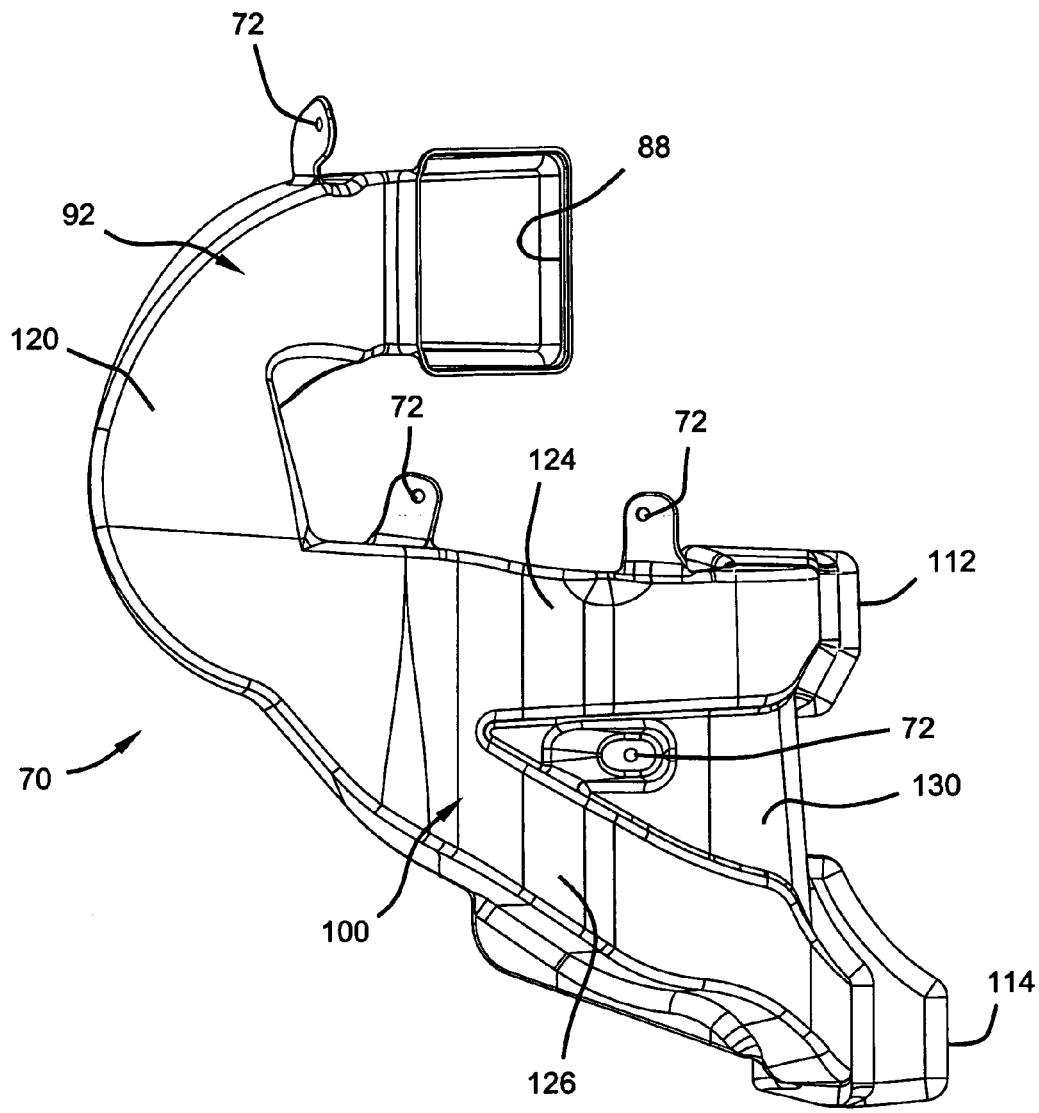
FIG. 7 is a plan view of the passenger foot duct.
Figure 8:
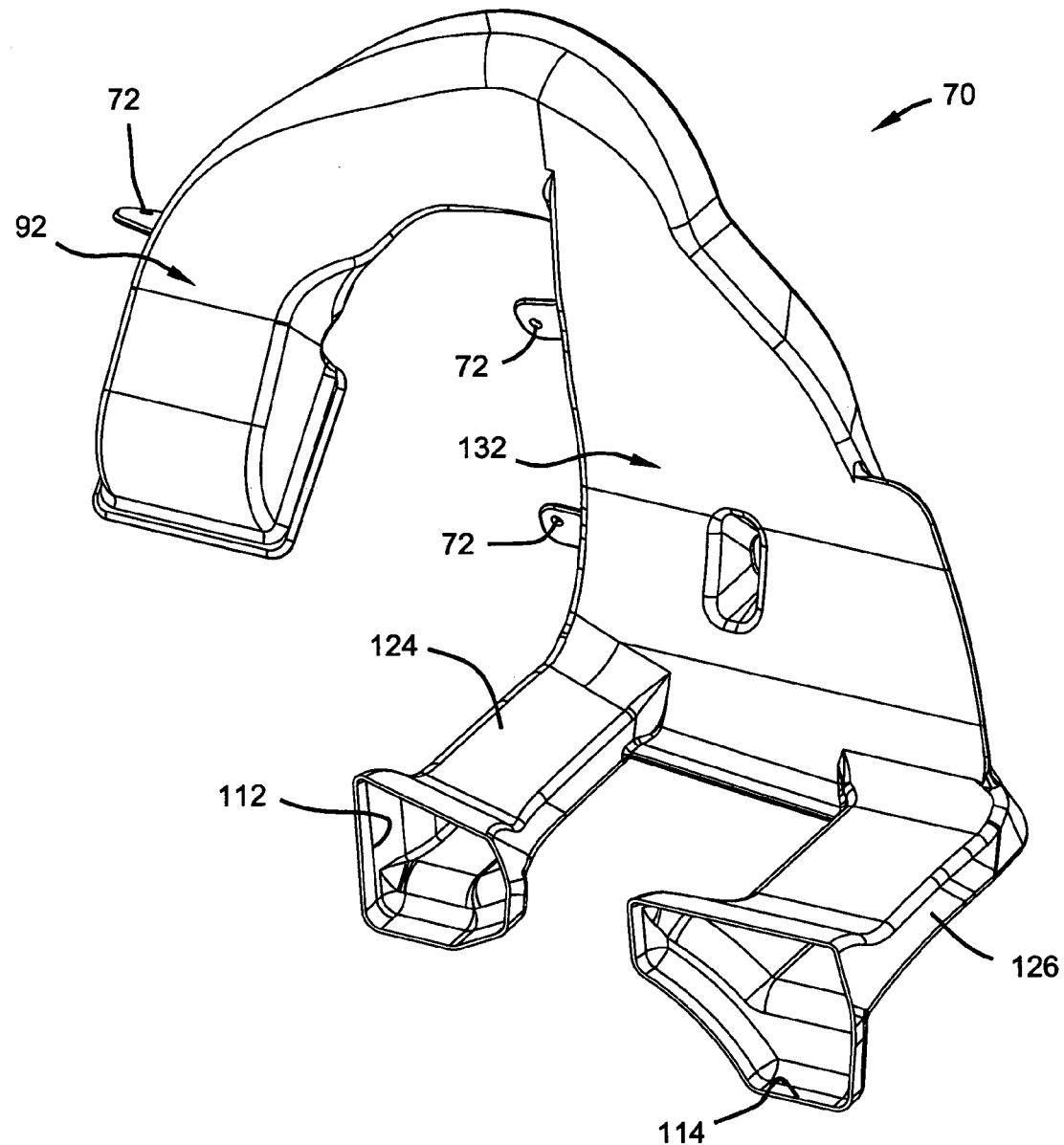
FIG. 8 is a bottom perspective view of the passenger foot duct
Figure 9:
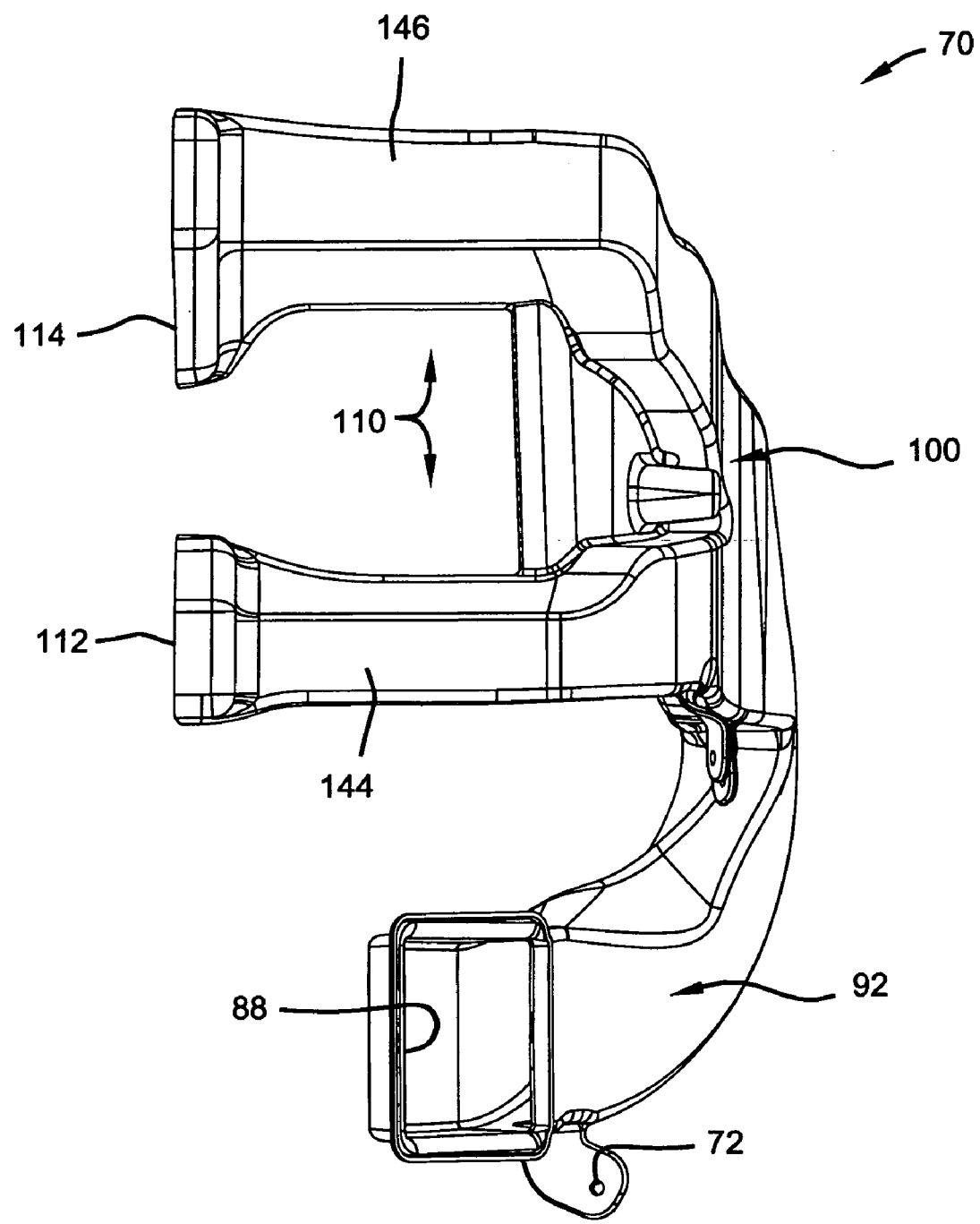
FIG. 9 is a rear view of the passenger foot duct.

The intermediate portion 100 directs air toward the front of the vehicle to a downstream portion 110 (FIGS. 4 and 5). The downstream portion 110 directs air downward toward the floor of the vehicle and out a first and second outlet 112 and 114.

With particular reference to FIGS. 6–10, the passenger foot duct 70 will be further described. The input 88 delivers air through the upstream portion 92 defining a single passage 120. The single passage 120 directs air from the upstream portion 92 into the intermediate portion 100. The intermediate portion 100 divides the single passage 120 into a first and second passage 124 and 126. The transition from the single passage 120 into the first and second passage 124 and 126 is generally Y shaped. The transition from the single passage 120 into a first and second passage 124 and 126 improves the air delivery performance by directing a unique path of air toward each foot of the passenger at the foot well 78.

At the intermediate portion 100 and extending between the first and second passage 124 and 126 is a planar portion or flange 130. The structure of the flange 130 and the first and second passage 124 and 126 cooperate to form an upper boundary 132 (FIG. 8) to inhibit air flow from the storage container 74 and into the blower fan 108 (FIG. 3). The upper boundary 132 also reduces noise generated by the blower fan 108 from entering the passenger compartment through the storage compartment 74. It is appreciated that an additional seal such as foam may be added between an upper wall 136 of the storage container 74 and/or the upper boundary 132 of the intermediate portion 100 for further diminishing noise transmission into the passenger compartment.

From the first and second passage 124 and 126 at the intermediate portion 100, air is directed into a respective first and second downstream passage 144 and 146. The first and second downstream passage 144 and 146 direct air out of the passenger foot duct 70 at the first and second outlets 112 and 114.

Figure 10:
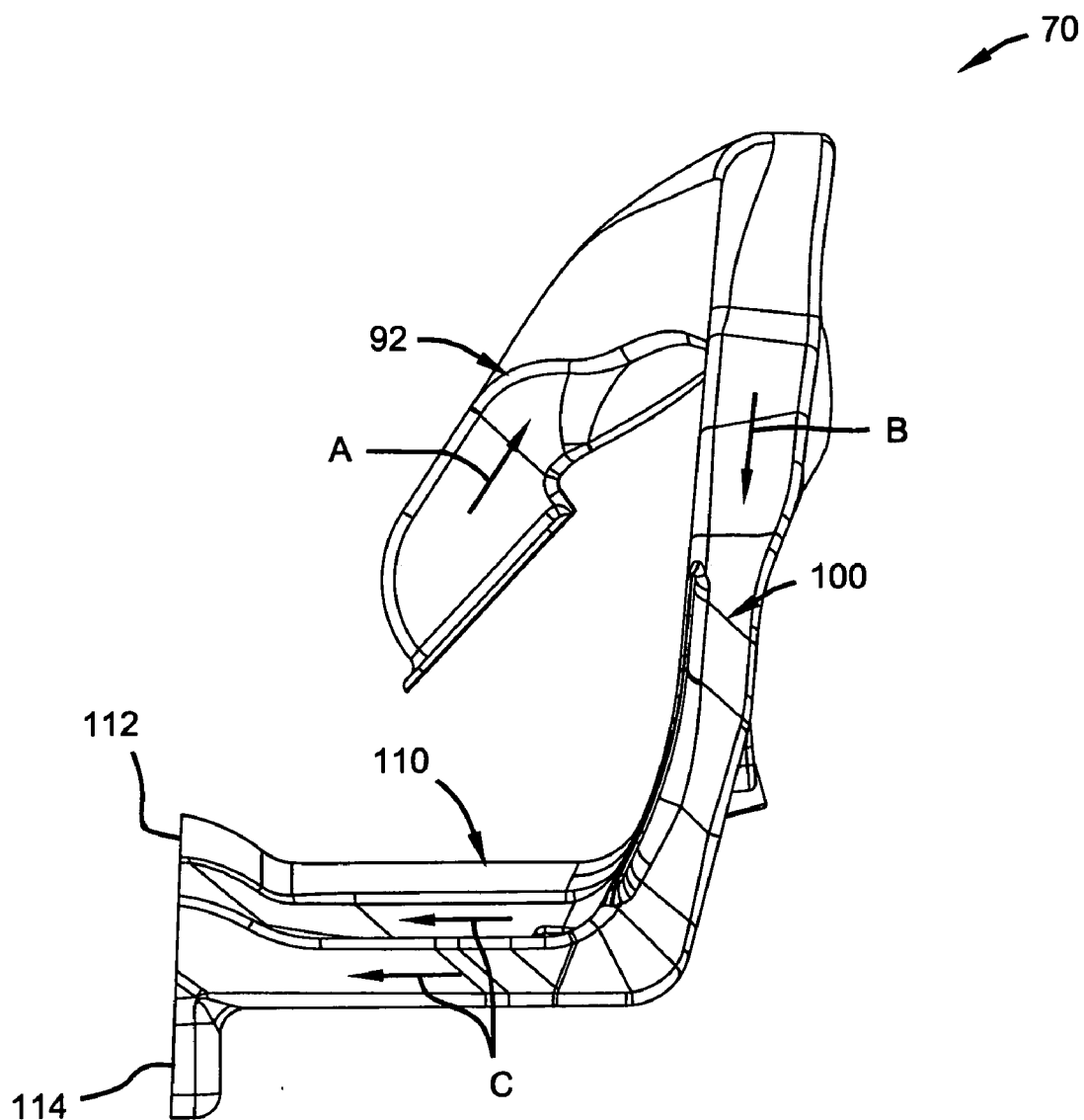
FIG. 10 is a side view of the passenger foot duct.

With particular reference now to FIG. 10, the directional orientation of the passenger foot duct 70 will be described. The upstream portion 92 directs air in a first direction A generally upward and away from the foot well 78 and the first and second outlet 112 and 114 of the passenger foot duct 70. Air then transitions into the intermediate portion 100 and flows in a second direction B. From the intermediate portion 100, air then transitions into the downstream portion 110 and flows in a third direction C. The third direction C is generally transverse to the second direction B.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An HVAC assembly including an HVAC case disposed in a passenger compartment of a vehicle for delivering air at a passenger side foot well, the HVAC assembly comprising:
    a duct coupled to an opening on the HVAC case and configured to deliver air from the HVAC case to the passenger foot well having a front boundary, a lower boundary and two side boundaries, said duct comprising:
        an input coupled to said opening on the HVAC case and accepting air into an upstream portion of the duct having a single passage, said upstream portion of the duct directing air in a direction away from said lower boundary of the passenger side foot well;
        an intermediate portion whereby said single passage divides into a first and second passage; and
        a first and second outlet coupled to and downstream of said first and second passage and dispensing air at the passenger side foot well;
        wherein said intermediate portion and a flange disposed between said first and second passage form an upper boundary to inhibit air flow from a storage compartment in said passenger compartment of the vehicle.

2. The HVAC assembly of claim 1 wherein said first and second passage include a first and second downstream portion connecting said first and second passage at said intermediate portion to said first and second outlet.

3. The HVAC assembly of claim 2 wherein said first and second passage extend in a first direction at said intermediate portion and extend at a substantially transverse direction at said first and second downstream portion.

4. The HVAC assembly of claim 2 wherein said intermediate portion includes a planar portion that borders said first and second downstream portion at a substantially perpendicular orientation with respect to said first and second downstream portion.

5. The HVAC assembly of claim 1 wherein the HVAC case houses a heater core.

6. An HVAC assembly for dispensing air onto a delivery area at the passenger side foot well of an automobile, the HVAC assembly comprising:
    an HVAC case disposed in a passenger compartment of the automobile and having an opening thereon; and
    a duct coupled to said opening and directing the air in a first direction away from the delivery area and into a downstream portion of the duct, said downstream portion of the duct directing the air in a second direction toward the delivery area and through an outlet portion at the passenger side foot well; said duct further comprising:
    an intermediate portion of the duct directing air in a third direction to said downstream portion; and
    a flange portion, said flange portion and said intermediate portion forming an upper boundary to inhibit air flowing out of said storage compartment.

7. The HVAC assembly of claim 6 wherein said opening in said HVAC case is positioned in said passenger compartment above the delivery area.

8. The HVAC assembly of claim 6 wherein a single passage is coupled to said opening and directs the air in said first direction to said intermediate portion at a location above said opening in said HVAC case.

9. The HVAC assembly of claim 6 wherein said downstream portion of said duct directs the air in said second direction, said second direction being toward a floor of the vehicle and substantially perpendicular to said third direction.

10. An HVAC assembly for delivering air at a passenger side foot well of an automobile, the HVAC assembly comprising:
    an HVAC case disposed in a passenger compartment of the automobile;
    a storage compartment disposed in said passenger compartment; and
    a duct coupled to an opening on said HVAC case and configured to deliver air from said HVAC case to the passenger side foot well, said duct comprising:
        an input coupled to said opening on said HVAC case;
        an intermediate portion of the duct positioned above said storage compartment in said passenger compartment of the vehicle, said intermediate portion of the duct being arranged to cover a portion of an upper opening in said storage compartment to impede air flowing from the storage compartment through the upper opening in the storage compartment; and
        a downstream portion of the duct for directing the air from said intermediate portion of the duct and into the passenger side foot well.

11. The HVAC assembly of claim 10 wherein said opening in said HVAC case is positioned in said passenger compartment above the passenger side foot well.

12. The HVAC assembly of claim 10 wherein a single passage is coupled to said opening and directs the air in said first direction to said intermediate portion at a location above said opening in said HVAC case.

13. The HVAC assembly of claim 11 wherein said intermediate portion of said duct occupies an area above a storage compartment in said passenger compartment of the vehicle.

14. The HVAC assembly of claim 10 wherein said intermediate portion branches said single passage into a distinct first and second passage, said intermediate portion including a flange extending between said first and second passage.

\* \* \* \* \*